Sept. 30, 1958 W. H. FRANK ET AL 2,854,074
COMPOSITE ELECTRICAL CONDUCTOR AND METHOD
AND APPARATUS FOR PRODUCING SAME
Filed Sept. 6, 1952 6 Sheets-Sheet 1
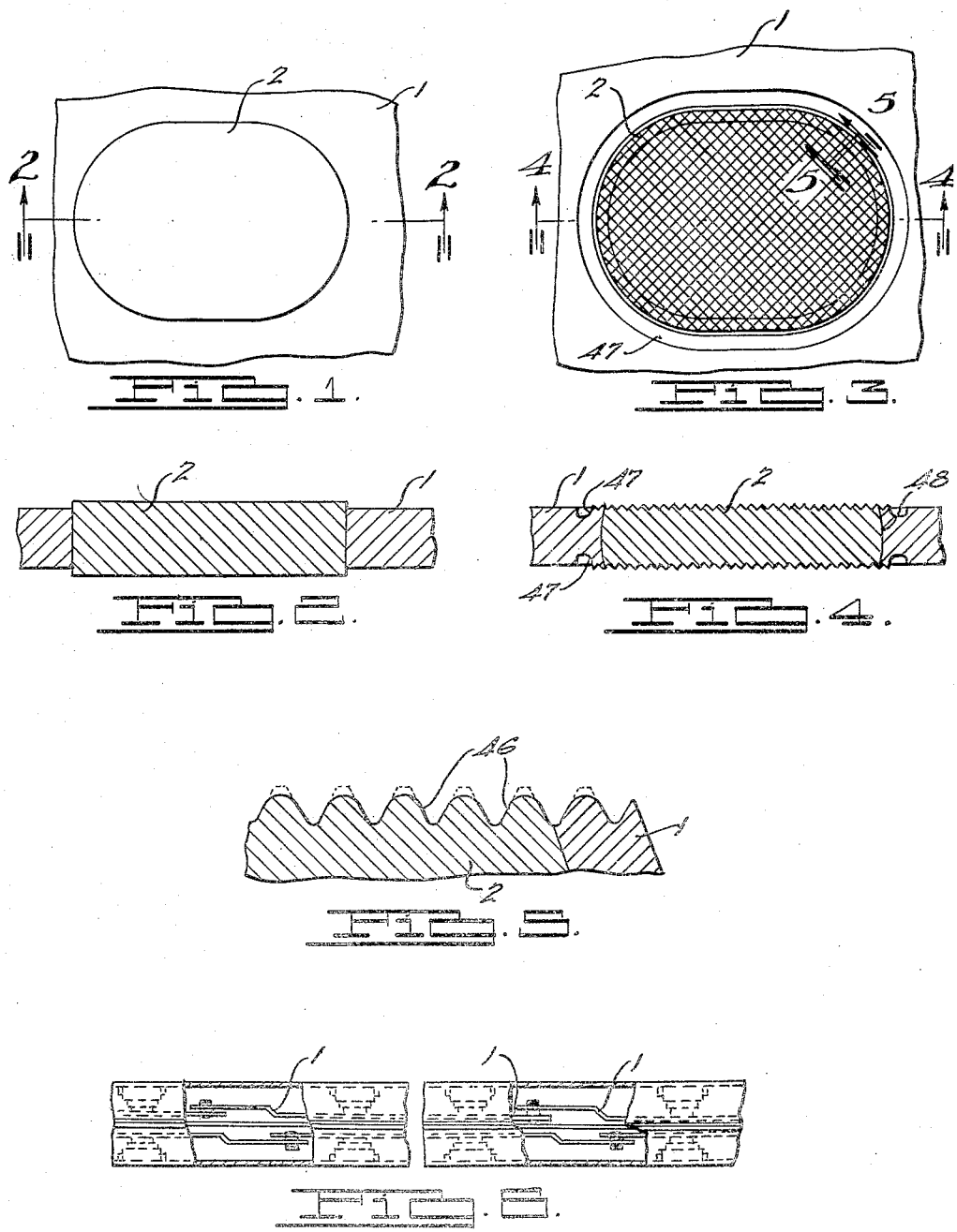
INVENTORS
William H. Frank,
Elwood T. Platz.
BY
J. Eugene Rychlewsky
ATTORNEY

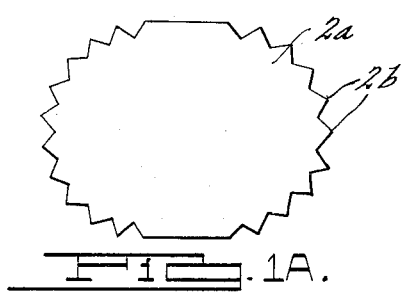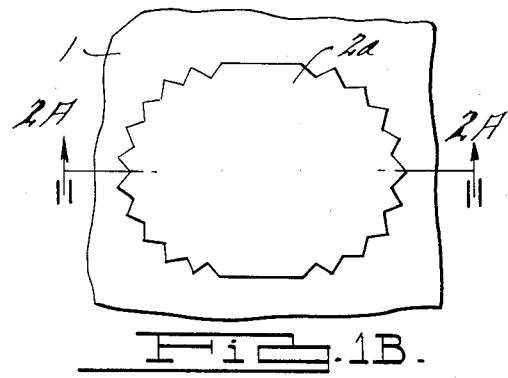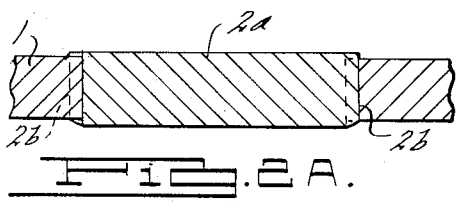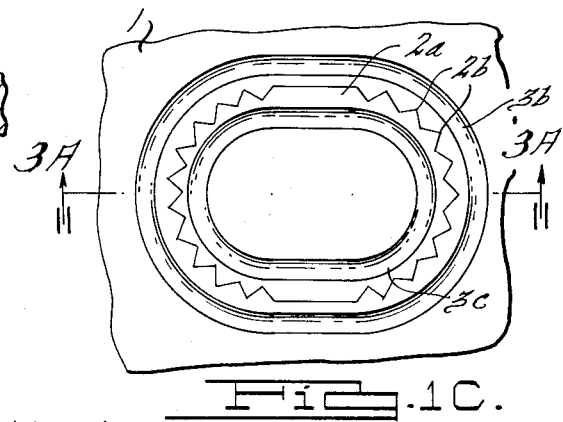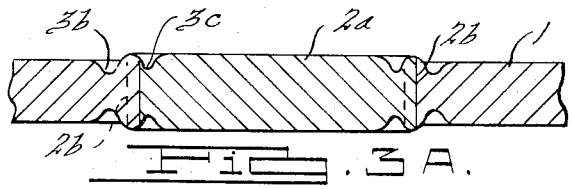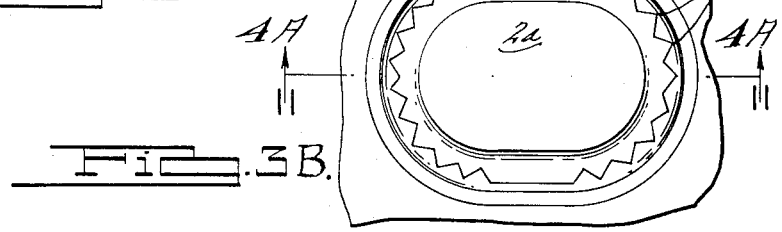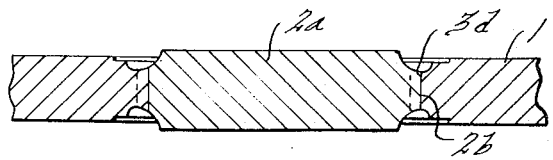

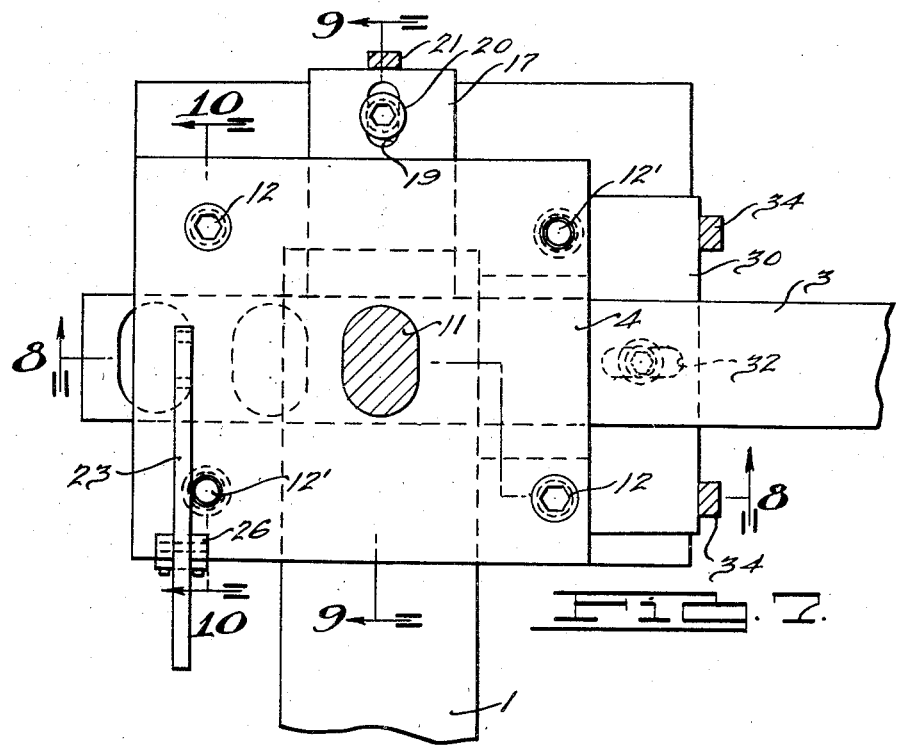
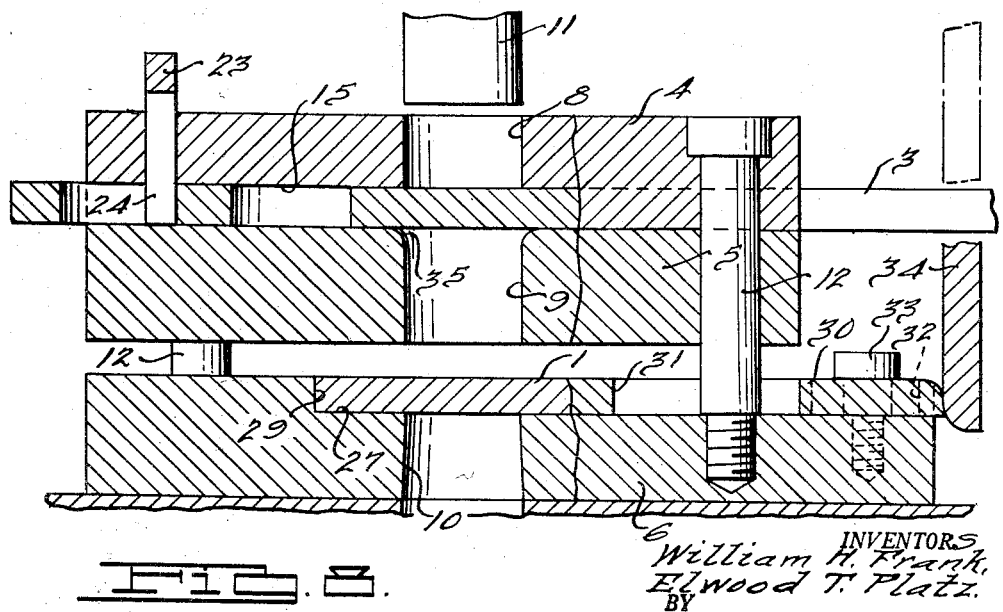

Sept. 30, 1958 W. H. FRANK ET AL 2,854,074
COMPOSITE ELECTRICAL CONDUCTOR AND METHOD
AND APPARATUS FOR PRODUCING SAME
Filed Sept. 6, 1952 6 Sheets-Sheet 4

INVENTORS
William H. Frank.
Elwood T. Platz.
BY
S. Eugene Bychinsky
ATTORNEY.

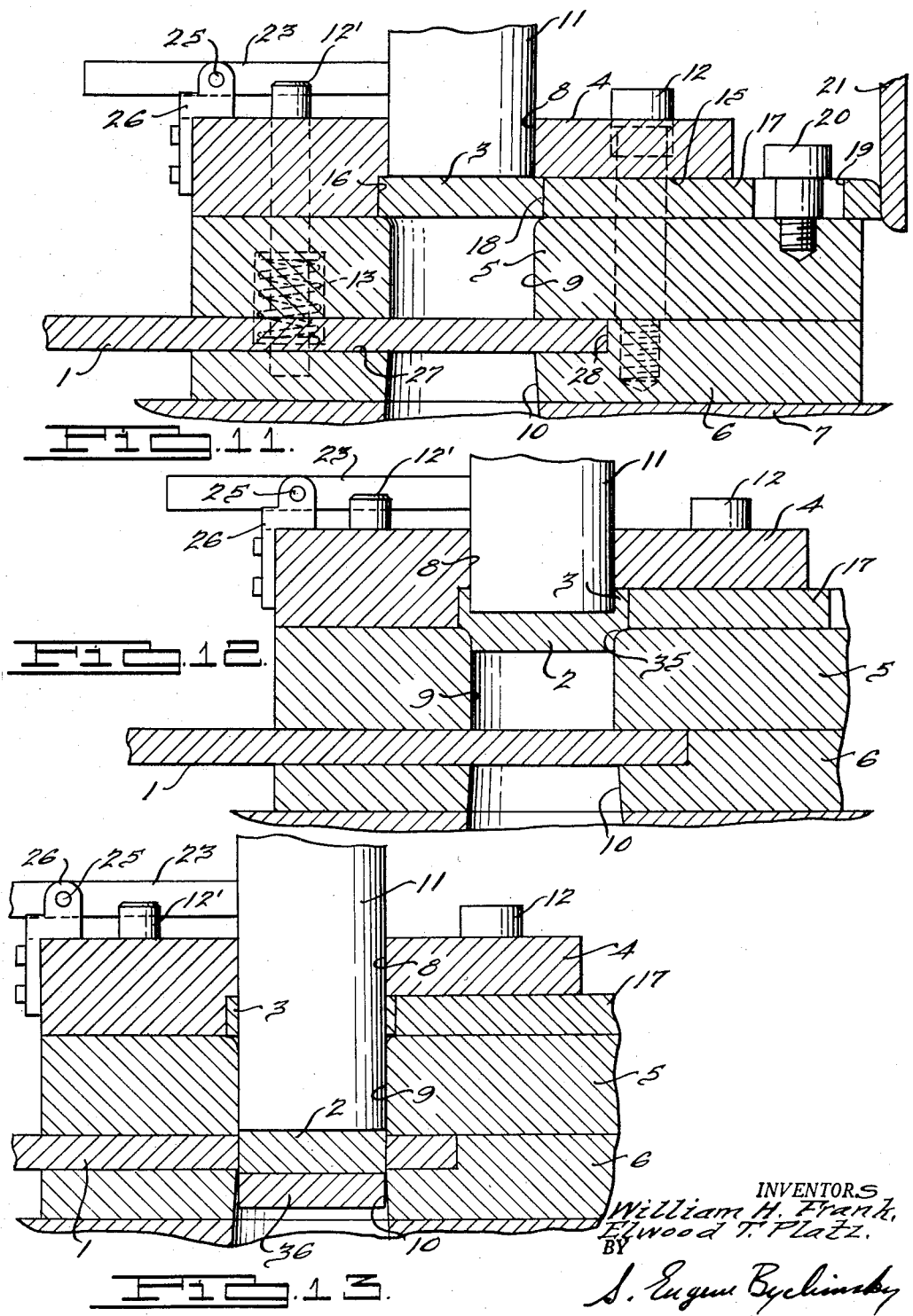

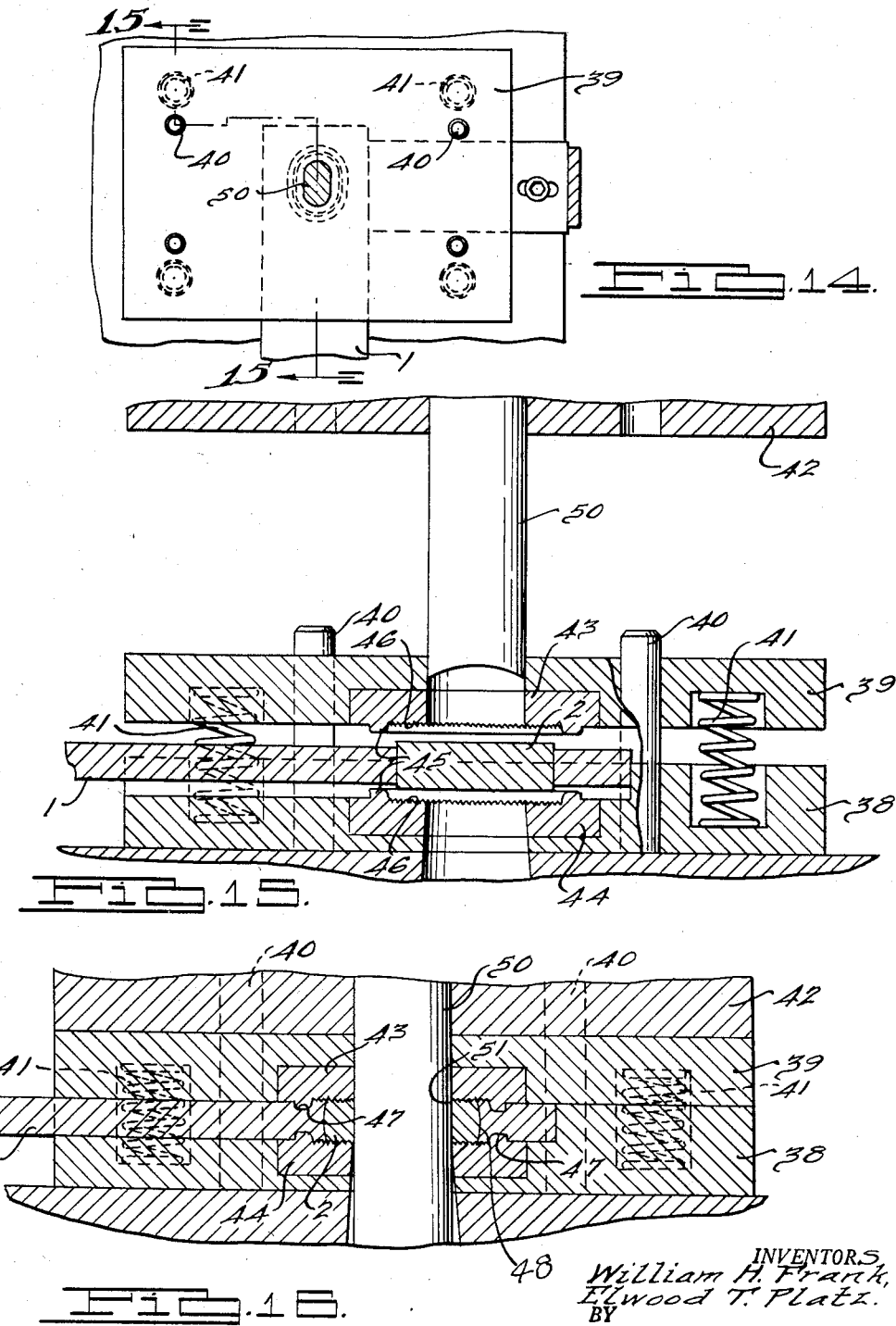

United States Patent Office 2,854,074
Patented Sept. 30, 1958

2,854,074
COMPOSITE ELECTRICAL CONDUCTOR AND METHOD AND APPARATUS FOR PRODUCING SAME

William H. Frank and Elwood T. Platz, Detroit, Mich., assignors, by mesne assignments, to I-T-E Circuit Breaker Company, Philadelphia, Pa., a corporation of Pennsylvania Application September 6, 1952, Serial No. 308,212

1 Claim. (Cl. 164—25)

The present invention relates to improvements in composite electrical conductors, to improvements in methods of forming such conductors, and to improvements in apparatus for forming such conductors.

Copper has been the preferred material from which electrical conductors have been made. Aluminum is becoming more abundant and from an economical point of view, as well as other considerations, it is becoming increasingly desirable to employ aluminum to conduct electrical currents. One principal disadvantage in the use of aluminum as an electrical conductor is caused by the strong affinity aluminum has for oxygen. Aluminum oxides readily form at all exposed surfaces of aluminum and aluminum oxides are highly resistant to electrical currents. This circumstance creates a problem in the use of aluminum for electrical conductors since aluminum surfaces cannot readily be joined together to form a satisfactory electrical conducting contact. Moreover, if an aluminum conductor is joined to a copper conductor, in the presence of moisture, an electrolytic action takes place which causes an erosion of the contact. Consequently, the principal problem that must be dealt with to employ aluminum as an electrical conductor is to provide it with a contact surface which permits it to be readily joined either to other aluminum conductors or alternatively to other copper conductors. Particularly since copper has been and continues to be widely used as the conductor in electrical apparatus, it is desirable that the aluminum conductors be as readily and satisfactorily joined to copper conductors as to other aluminum conductors and that the resulting electrical contact formed by the juncture of an aluminum conductor with either other aluminum conductors or copper conductors be initially and continually satisfactory in its contact performance.

This invention approaches the solution to this problem through the following concept:

It views an electrical conductor system as comprising contact areas where contact is made either between lengths of electrical conductors or between an electrical conductor and a connecting piece of apparatus and with these contact areas connected to each other through a suitable electrical conductor material. We therefore propose to provide these electrical contact areas of copper and of the shape and size and form and with the other characteristics of the usual copper contact areas generally employed in electrical conductor systems. We then propose to inter-connect these contact areas with lengths of aluminum conductors so that the end result is a composite structure consisting of aluminum conductors having the usual copper contact areas at the usual locations where such copper contact areas have previously occurred.

By way of illustration of the use of such a composite conductor, reference is made to Togesen Patent No. 2,287,502 in which a bus duct is formed by inter-connecting a plurality of lengths of bus bars. According to our present invention the bus bars used in such a structure will maintain the copper contact areas where they are interconnected as heretofore employed in copper conductors but with such contact areas now inter-connected by aluminum conductors therebetween. Thus the composite bus bars of this invention can readily be interconnected to each other or to copper bus bars which have been heretofore or might be alternatively employed.

The problem of forming such composite bus bars of this invention has two phases, namely: the actual composite bus bar construction, per se, and the process of manufacture of such composite bus bars. It is the principal object of this invention to provide such a composite bus bar and an economical and efficient method of manufacturing same.

The composite electrical conductor of the present invention is formed of two different metals, one of which readily oxidizes relative to the first, but in which the article is so formed that there is no substantial oxide between the adjoining surfaces of the two metals so that the electrical conductivity, or the efficiency, of the conductor is not impaired. In other words, the metals are so joined that the adjoining surfaces of the metals are in intimate contact. Specifically, the composite article of the present invention is illustrated as an elongated bar in which the major portion of the conductor is formed of an aluminum, or an aluminum alloy, which has inserted therein copper, or copper alloy, elements.

It is recognized that aluminum readily oxidizes, as compared to copper, and according to the present invention, the joint between the copper and aluminum is such that the adjoining metals are in intimate contact and substantially free of oxides. The adjoining lengths of the composite conductors are then connected by way of the copper inserts, in copper-to-copper contact, or when used as a plug-in duct, the contact fingers of the plugs are disposed in direct contact with the surfaces of the copper inserts.

The method and the apparatus of the present invention are such that the copper insert is first punched out of a strip of copper stock and immediately forced through the aluminum stock so that the copper insert serves as the die in punching out the metal from the aluminum strip. The copper insert thus immediately replaces the metal displaced in the aluminum strip so that there is not sufficient exposure of the aluminum metal to form an oxide and the adjacent walls of the copper and aluminum are in intimate contact which is substantially free of oxides therebetween. In the specific method employed, a further coining step is followed which further insures a tight and intimate contact between the copper insert and the aluminum strip.

One of the primary objects of the present invention is to provide an economical and practical composite electrical conductor having comparable conducting properties with those of copper.

A further object of the invention is to provide a novel electrical conductor which effects a considerable saving in scarce critical materials but which is still as relatively efficient as a conductor formed of the scarce materials alone.

A further object of the invention is to provide an improved method of intimately adjoining two different metals, one of which readily oxidizes relative to the other, in such a way that the adjoining surfaces of the metals are in intimate contact, substantially free of oxides therebetween.

A further object of the invention is to provide improvements in a composite die whereby the method heretofore mentioned may be carried out and the composite electrical conductor heretofore mentioned produced.

Other objects of the present invention will become apparent from the following specification, the drawings relating thereto, and from the claim hereinafter set forth.

In the drawings, in which like numerals are used to designate like parts in the several views throughout:

Figure 1 is a fragmentary top plan view of a portion of one embodiment of an electrical conductor of the present invention, showing it in one stage of its manufacture;

Figure 1A is a plan view of another embodiment of the copper insert having serrated edges.

Fig. 1B is a plan view of a portion of another embodiment of a composite conductor at an intermediate stage of manufacture showing the insert disposed in the conductor.

Fig. 1C is a plan view of a portion of another embodiment of the composite conductor in its final form.

Fig. 2 is a cross sectional view taken substantially along the line 2—2 of Fig. 1;

Fig. 2A is a cross section as if on line 2A—2A of Fig. 1B;

Fig. 3 is a view similar to Fig. 1, showing the composite conductor in another stage of its manufacture;

Fig. 3A is a cross section as if on line 3A—3A of Fig. 1C;

Fig. 3B is a plan view of a portion of another embodiment of the composite conductor showing it in its final form.

Fig. 4 is a cross sectional view, taken substantially along the line 4—4 of Fig. 3;

Fig. 4A is a cross section as if on line 4A—4A of Fig. 3B;

Fig. 5 is an enlarged cross sectional view taken substantially along the line 5—5 of Fig. 3;

Fig. 6 is a fragmentary view of a bus duct of the type disclosed in the Togesen patent above referred to and illustrating one manner in which the composite bus bars of the present invention may be employed;

Fig. 7 is a top plan view of a die employed in manufacturing the composite conductor of the present invention;

Fig. 8 is a cross sectional view taken substantially along the line 8—8 of Fig. 7;

Fig. 11 is a view similar to Fig. 9 and illustrating one of the initial steps in the method of the present invention;

Fig. 12 is a view similar to Fig. 11, illustrating the succeeding step in the present invention;

Fig. 13 is a view similar to Fig. 11 illustrating a further step in the method of the present invention;

Fig. 14 is a fragmentary top plan view of a coining die employed in the method of the present invention;

Fig. 15 is an enlarged cross sectional view, taken substantially along the line 15—15 of Fig. 14; and Fig. 16 is a view similar to Fig. 15 and showing a further step in the method of the present invention.

Figure 9:
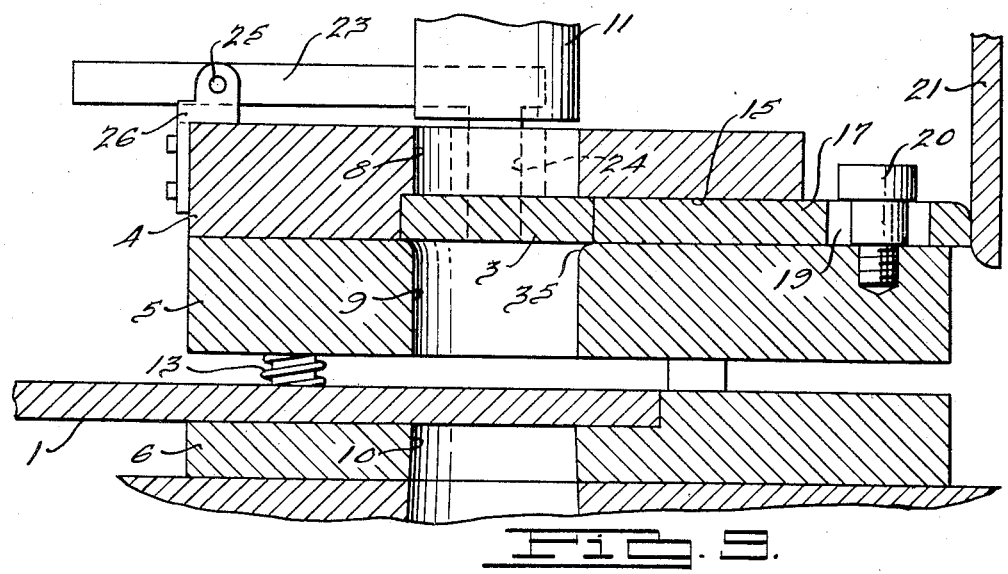
Fig. 9 is a cross sectional view taken substantially along the line 9—9 of Fig. 7.

Referring to the drawings, one form of the composite electrical conductor is specifically illustrated, which comprises an elongated bar 1 of aluminum having a copper insert 2 disposed therein. Such bars 1 are rectangular in cross section and are formed in standard lengths, in practice, and interconnected at their overlapping adjoining ends, as illustrated in Fig. 6, to form bus ducts. The copper inserts are disposed adjacent the ends of the bars 1 and are provided with openings therethrough (not shown in Fig. 6), through which interconnecting bolts are disposed to interconnect the adjoining ends of the bars in copper to copper contact. The interconnecting contacting surfaces are thus free of oxides and the adjoining surfaces between copper and aluminum are likewise in intimate contact and free of oxides, as will be more apparent from the complete description of the article and the method and apparatus for forming it.

Another form of the composite electrical conductor is shown in Fig. 1C. In this embodiment an insert 2a (Fig. 1A) having serrated edges 2b is disposed in an elongated bar 1 to provide more intimate contact between the insert 2a and the bar 1. Coined depressions 3b and 3c are formed in the bar 1 and the insert 2a respectively as shown in Fig. 3A. These coined depressions may be formed in both insert and the bar or in either the bar or the insert. Still another variation of the coined depression is shown in Fig. 3B. In this variation one coined depression is formed with its lowest point at the periphery of the serrations 2b. These coined depressions are formed by the novel die as indicated hereafter.

When employed with the plug-in type, the copper inserts 2 are disposed in the bars at pre-determined spaced intervals along its length, in the positions desired for contact by the fingers or prongs of the plugs, so that the prongs of the plug directly engage the surfaces of the copper inserts.

The composite conductor may be formed by the composite die illustrated in Figs. 7 through 13 in which the copper insert 2 is punched out of an elongated strip of copper stock 3 and then disposed in the aluminum strip in intimate metal-to-metal contact therewith.

The die comprises an upper section 4, an intermediate section 5, and a lower section 6, all of which are suitably supported upon a table or other support 7. Aligned openings 8, 9, and 10 are formed in the die sections 4, 5, and 6, respectively, and a punch 11 having a shape complementary to the shape of the openings 8 and 9, and having the shape of the insert, is suitably supported above the die parts for reciprocation, and suitable means are provided for reciprocating the punch as desired. To form the insert shown in Fig. 1A the punch 11 will be formed with serrations. Upper section 4, intermediate section 5 and lower section 6 of the die will have serrations complementary to those of punch 11.

In the embodiment of Fig. 1 the punch and the openings 8, 9, and 10 are the shape of the insert, as illustrated by the shape of the insert 2 in Fig. 1.

Figure 10:
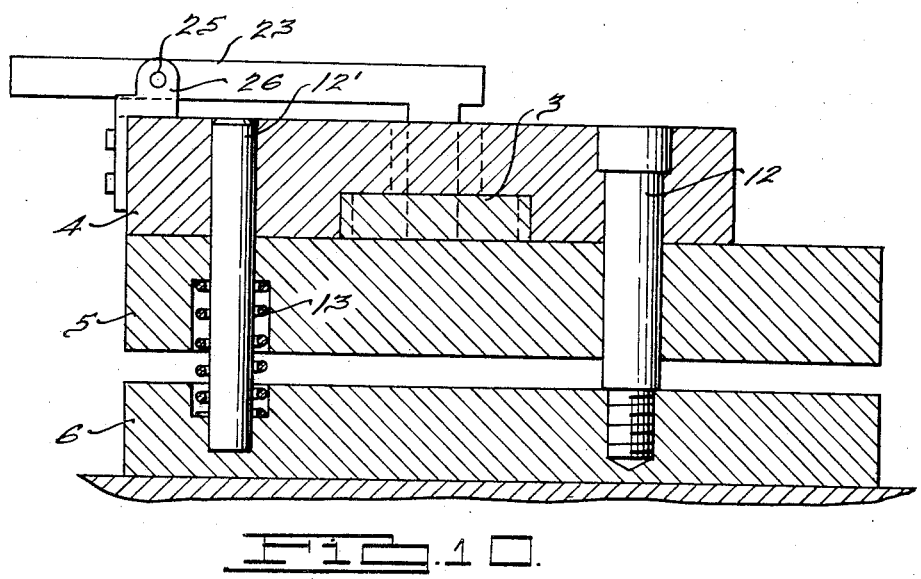
Fig. 10 is a cross sectional view taken substantially along the line 10—10 of Fig. 7.

The die parts 4, 5, and 6 are aligned with respect to each other by suitable guide pins 12 and 12' extending through openings therein, with the die sections 4 and 5 mounted for sliding movement on the guide pins toward and away from the section 6. The die sections 4 and 5 are held in spaced relation with respect to the die section 6, by means of compression coil springs 13 which embrace the diagonally disposed guide pins 12'. The springs 13 are disposed in facing recesses found in the facing surfaces of the die parts 5 and 6, as shown in Fig. 10.

The upper die section is formed with a cut-away part or channel 15 on the under surface thereof, which is defined by a guide edge 16 against which one side of the strip 3 is disposed above opening 9 of the intermediate section 5. A spacer and guide plate 17 is disposed between the under surface of the removed portion 15 and the top surface of the intermediate section 5, and has an inner edge 18 which abuts against the adjacent side of the strip 3 to position and hold the strip during the punching operation. The guide 17 is formed with an elongated slot 19 through which a guide pin 20 extends for mounting the plate 17 on the top surface of the intermediate section 5, and the plate 16 is forced inwardly to position the strip 3 against the guide surface 16 by means of an operating finger 21. The finger 21 may be pivotally mounted in a suitable location and it will be obvious that by pivoting the finger, the plate 17 is forced inwardly against the adjacent edge of the strip 3.

The copper strip 3 may be longitudinally positioned for each successive punching operation by means of an arm 23 having a depending finger 24 fixed thereto, the arm 23 being pivotally mounted by means of a pivot pin 25 to a bracket 26. The bracket 26 is fixed to one edge of the upper die section 4. As shown in Fig. 8, the depending finger 24 is lowered into the channel 15 within a punched opening in the copper strip so that it abuts against the adjacent faces of the strip 3. By pivoting the arm 23 the finger is raised so that the strip 3 may be moved longitudinally and the finger 24 positioned within the next opening in the strip 3.

The strip of aluminum is disposed within a guide slot or channel 27 formed in the top surface of the lower die section 6, which terminates in an edge 28 (Fig. 11) to properly position the strip 1 within the lower section and above the opening 10. The strip 1 also abuts against the longitudinal edge 29 of the channel 27 (Fig. 8) and is held against such edge by means of a guide plate 30. The guide plate 30 is positioned on the top surface of the cut-away portion 27 and is provided with elongated slots 31 through which the guide pins 12 and 12' extend and is also formed with an elongated guide slot 32 through which a guide pin 33 extends. The guide pin 33 is threaded into the lower section 6. The plate 30 is moved against the adjacent edge of the aluminum strip 1 by means of fingers 34 which engage the outer edge thereof and which may be pivoted or otherwise moved to force the plate 30 inwardly against the strip 1.

In the method of the present invention and in the operation of the dies above described, the aluminum strip 1 and the copper strip 3 are disposed in the die sections as shown in Fig. 8. The punch 11 is then actuated so that it passes into the opening 8 against the copper strip to the position shown in Fig. 11. The upper die section 4 and the intermediate section 5 are then depressed against the back of the spring so that they are forced against the top surface of the lower die member section 6. Continued movement of the punch 11, as shown in Fig. 12, causes the insert 2 to be punched out of the strip 3.

One of the important features of the present invention is in the formation of the rounded peripheral edge 35 of the opening 9. It has been found in practice that by rounding this edge as indicated, the peripheral edge of the insert which is punched out of the copper stock is not fractured to any substantial extent. Thus the periphery of the insert is smooth and substantially free of fractures, further eliminating the possibility of oxidation of the adjacent wall of the aluminum strip when the insert is disposed therein.

A continued depression of the punch 11 causes the insert 2 to pass through the die opening 9 and against the aluminum strip 1 so that the insert 2 bears against the aluminum strip immediately above the opening 10. Continuation of the movement of the punch 11 to the position shown in Fig. 13 causes the insert 2 to act as a punch, punching out a corresponding slug 36 from the aluminum strip. The stroke of the punch 11 and the relative thicknesses of the copper 3 and strip 1 are such that the insert 2 is thicker than the strip 1 and in its final position is disposed with its surfaces outwardly spaced from the adjacent walls of the strip 1, as shown in Fig. 13.

The composite strip is then in either the form shown in Figs. 1 or 1B. A subsequent coining step may be employed by the apparatus shown in Figs. 14, 15, and 16. Here the composite strip, including the strip 1 and the insert 2 or 2a, as shown in Figs. 1 and 1A, is disposed between a lower coining die part 38 and an upper coining die part 39. Such parts are held in proper relationship by means of guide pins 40 for sliding movement relative to each other and are held in spaced relation by coil springs 41. The coil springs 41 are disposed within facing recesses formed in the die parts 38 and 39.

A press 42 is disposed above the die parts and is suitably actuated to engage the top surface of the die part 39.

The coining dies include an upper die 43 and a lower die 44 disposed within facing depressions in the die parts 39 and 38, respectively, and such die parts have annular facing projections 45 and serrated faces 46 to form the embodiment of Fig. 3. The serrations of the faces 46 are disposed at 90° with respect to each other so that the resulting serrations on the opposite faces of the copper insert will be disposed at 90°. When the press 42 is brought against the top surface of the die part 39, with the tops of the guide pins 40 received within aligned openings in the press 42, the upper die part 39 is moved downwardly so that the upper and lower dies 43 and 44 act upon the insert and the surrounding portion of the aluminum strip to form the serrated surfaces on opposite sides of the insert 2 or 2a and to form the opposite annular grooves 47 in the aluminum around the insert. The formation of the grooves 47 effects a deformation of the opening in the aluminum strip within which the copper insert is disposed, as indicated by the curved line 48, and this results in a further clamping action on the insert and insures an intimate metal-to-metal contact between the insert and the adjacent wall of the aluminum opening. The grooves 3b, 3c, 3d are formed in the same manner. The faces of the insert 2 are still spaced outwardly slightly from the surfaces of the aluminum bar 2 so that when the adjacent ends of the composite sections are adjoined there will be copper-to-copper contact through the inserts only.

As mentioned above, when employed in a duct of the type shown in Fig. 6, the sections are connected together by means of nuts and bolts. A punch 50 may be employed in the coining operation to punch an opening 51 out of the insert 2 and such opening is adapted to receive the interconnecting bolt. When used with a plug-in duct, the opening 51 would not be formed.

By having the serrations of the embodiment of Fig. 3 on opposite sides of the insert disposed at 90° with respect to each other, when the adjoining sections are disposed and interconnected as shown in Fig. 6, the serrations of the adjacent sections will interlock to provide a firm connection therebetween.

Formal changes may be made in the specific embodiment of the invention described without departing from the spirit of the invention, the scope of which is commensurate with the appended claim.

What is claimed is:

A composite die comprising first, second and third die members, means forming aligned first, second and third openings in said die members respectively, said second opening having a rounded peripheral edge at the upper portion thereof, means for receiving and supporting a metal stock member between said first and second die members and over and against the adjacent edge of said second opening, means for receiving and supporting another metal stock member between said second and third die members and over and against the adjacent edge of said third opening, and a punch receivable through said first opening and into said second opening to punch an insert from said first named stock member through said second opening and into and through said second named stock member to dispose said insert into said second named stock member.

References Cited in the file of this patent

UNITED STATES PATENTS

| | | |
|---|---|---|
| 871,685 | Freier | Nov. 19, 1907 |
| 895,441 | Dorff | Aug. 11, 1908 |
| 1,128,532 | Schmidt | Feb. 16, 1915 |
| 1,405,534 | Merritt | Feb. 7, 1922 |
| 1,928,443 | Archer et al. | Sept. 26, 1933 |
| 2,163,683 | Heller | June 27, 1939 |
| 2,177,377 | Polivka | Oct. 24, 1939 |
| 2,192,751 | Melchior et al. | Mar. 5, 1940 |
| 2,210,750 | Cook | Aug. 6, 1940 |
| 2,275,438 | Hothersall | Mar. 10, 1942 |
| 2,360,063 | Larson | Oct. 10, 1944 |
| 2,611,001 | Ridgers | Sept. 16, 1952 |
| 2,646,613 | Enzler | July 28, 1953 |

FOREIGN PATENTS

| | | |
|---|---|---|
| 463,044 | Canada | Feb. 7, 1950 |